No. 633,686. Patented Sept. 26, 1899.
G. T. COOLEY.
ORE CONCENTRATOR.
(Application filed June 4, 1898.)
(No Model.)
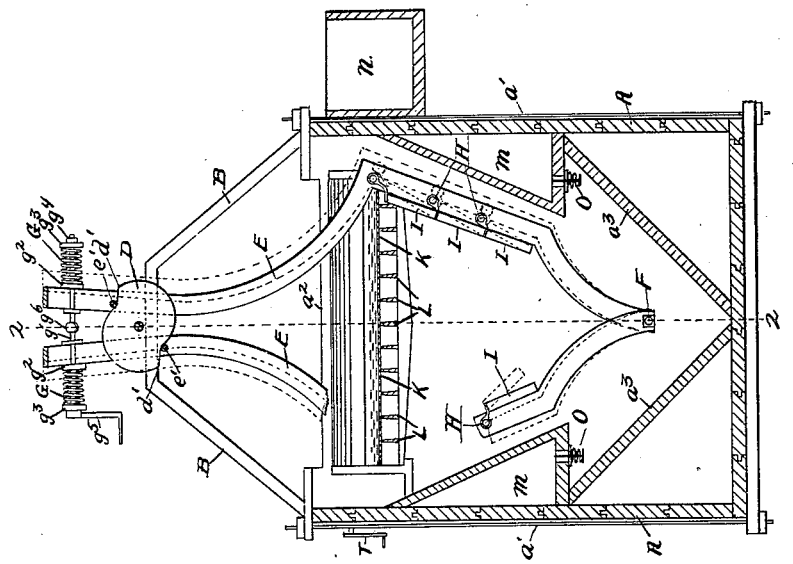
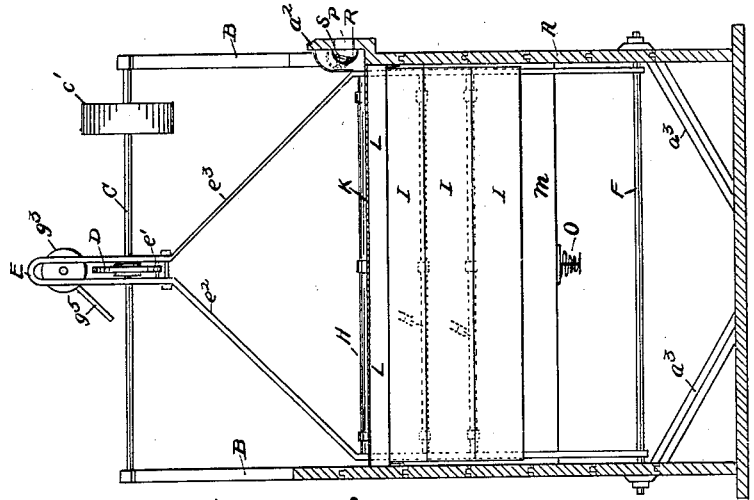
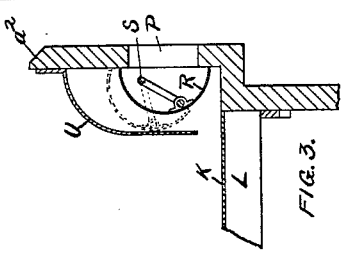
Witnesses
Brayton G. Richards.
Thomas D. Corry
Inventor
George T. Cooley.
By Attorney,
George B. Partington

UNITED STATES PATENT OFFICE.

GEORGE T. COOLEY, OF JOPLIN, MISSOURI.

ORE-CONCENTRATOR.

SPECIFICATION forming part of Letters Patent No. 633,686, dated September 26, 1899.

Application filed June 4, 1898. Serial No. 682,583. (No model.)

*To all whom it may concern:*

Be it known that I, GEORGE T. COOLEY, a citizen of the United States, residing at Joplin, in the county of Jasper and State of Missouri, have invented certain new and useful Improvements in Ore-Concentrators, of which the following is a specification.

My invention is an improvement in that class of ore-concentrators known as "concentrating-jigs." In these devices a quantity of ore, gangue, &c., is placed on a sieve situated over or slightly submerged in a tank of water, the tank being provided with a piston or similar means, whereby intermittent currents of water may be suddenly forced upward through the sieve. This sudden flow of water through the sieve tends to carry the ore, gangue, &c., resting thereon with it, the gangue and other lighter substances being carried away by the current, while when the current stops the ore being heavier settles back on and through the sieve, thus being separated from the waste materials. To produce these intermittent currents, a piston or its equivalent is intermittently operated on the water in the tank to force it upwardly through the sieve. In the present system of jigging the action of the forward stroke of the piston in raising and loosening the ore-bed is much interfered with by the immediate backward stroke of the piston at the same velocity, tending to tighten the bed of ore too quickly by producing suction through it. This backward flow or suction through the sieve is partly overcome by an inflow of water, but is only partly overcome, so that there is always a suction or downward flow through the sieve on the back-stroke of the piston which tends to draw back the gangue and other light particles, thus rendering the separation incomplete.

The object of my invention is to furnish an improved ore-concentrator capable of a complete separation; and the invention consists in the combination and arrangement of parts hereinafter set forth and claimed.

In the drawings, Figure 1 is a vertical section of an ore-concentrator embodying my invention. Fig. 2 is a section on line 2 2 of Fig. 1. Fig. 3 is a detailed section showing, on an enlarged scale, the discharge-opening furnished with an ore-guard and gate for closing it.

A refers to the walls of the water-tank; B, to supporting-arms which support the shaft C; D, to a cam carried by the shaft; E, to wing arms, and F to a supporting-rod on which the wing arms are pivoted.

The walls A of the water-tank are preferably made of heavy boards tongued together and reinforced by the tie-rods $a'$, so as to form a strong water-tight compartment. Extending upward from the sides are supporting-arms B, on which is mounted the shaft C. The shaft C is preferably provided with a pulley $c'$ for transmission of steam or horse power, but may be provided with a crank and be driven by hand. A cam D is mounted on shaft C, so that it will contact with the rollers $e'$, carried by the wing arms E. The wing arms E are pivoted to and supported by the rod F, which is mounted on the walls A, and are pressed toward each other at their upper ends by means of springs G. It will be seen that upon rotation of the shaft C the cam D will slowly force the wing arms E apart until the rollers $e'$ reach the point of the cam $d'$, when the springs G throw the arms together, causing a sudden stroke. Upon further rotation of the cam D this stroke is repeated, so that when the shaft C is rotated at a uniform velocity this stroke will be repeated at regular intervals. The cam D is preferably so constructed that the time required to force the upright swinging arms apart preparatory to another stroke is several times the time required to make the stroke, so that the ore has sufficient opportunity to settle through the lighter material in the bed. In constructing larger concentrators it may be necessary to supply two or more cams in order to successfully operate the larger wing arms.

The springs G are mounted upon a shaft $g'$, carried by the wing arms E, and are given a bearing against the outer sides of the wing-arms E, preferably through washers or disks $g^2$, which slide upon the shaft $g'$. The fixed washers $g^3$ are rendered adjustable upon the shaft $g'$ by means of nuts $g^4$ and crank $g^5$, so that the strength of the springs G, and consequently the rapidity of the strokes of wing arms E, may be regulated while the machine is in operation. At its center the shaft $g'$ is preferably provided with a rubber buffer $g^6$, which serves to deaden the shocks caused by suddenly stopping the stroke of the wing arms E.

The wing arms E are preferably formed of two rails $e^2$ and $e^3$, which are close together at the top with just enough room for the cam D to freely pass between them and diverge as they pass downward to form a framework nearly as wide as the water-tank. Extending between these arms are rods H, to which are hung swinging gates or valves I. These gates I are slightly longer than the width of the frame formed by the wing arms E, so that they rest against and their motion in one direction is limited by these wing arms, while they are free to swing in the other direction, and their width is such that when against the wing arms they form, practically, a solid wall impervious to the passage of water.

Mounted near the top of the water-tank, between the wing arms E, so as not to interfere with their stroke, and extending the entire length of the water-tank is the sieve K, on which the ore to be treated is deposited. This sieve K is preferably supported by grate-bars L, which are in turn supported by the end walls of the water-tank.

At each side the water-tank is provided with compartments M, which are preferably water-tight, being supplied with water from a reservoir N and provided with spring-pressed valves O. The water in the compartment M is under some pressure, (at least atmospheric,) and the strength of the spring in the valve O is so regulated that when the wing arms E make their stroke and force a certain quantity of water up through the sieve K the internal pressure in the compartments M automatically opens the valves O until enough water flows out into the water-tank to take the place of that forced up through the sieve, whereupon the equilibrium of pressure is reestablished and the valves are closed by their springs. Attention is called to the fact that replacing of the water used at each stroke is entirely automatic and simultaneous with the use thereof, so that there can be no tendency for the water to flow back through the sieve during the inoperative movement of the wing arms E. It will be seen that as the wing arms E are forced apart by the cam D the gates I swing inwardly, as shown in dotted lines, allowing the water to pass freely through them, but that when the wing arms make their sudden stroke toward each other the gates I close and form, practically, a solid wall. The wing walls thus formed being simultaneously forced together tend to squeeze the water between them out in all directions; but as the space behind them is immediately and automatically filled by water from the supply-reservoirs the only direction which is open for the water between them to take is upward through the grate. Thus each wing wall forms an inclined plane. The effect of this relation is that when the wing arms are forced together the wedge-shaped body of water between is bodily lifted upward, the upper portion of it immediately passing through the grate. This forces a uniform current through all parts of the grate, rendering its whole surface operative. As the current of water rushes up through the sieve K it loosens up the ore-bed supported thereby, carrying the different particles with it in a degree according to their size and specific gravities. When the upward rush of the water is stopped at the end of the stroke, the different particles settle back on and through the sieve K with velocities varying inversely to their specific gravities. According to this law the particles of ore settle much more rapidly than those of gangue, &c., so that the subsequent currents will ultimately carry all the lighter particles out over the overflow $a^2$, the purified ore either remaining on the sieve or filtering through into the tank below and being collected in the bottom by means of the hoppered sides $a^3$, from which it is removed through a door. The larger particles, which are retained on the sieve, are removed through a discharge-opening P, which extends the width or practically the width of the sieve. This opening is provided with a curved gate R, which is mounted on a crank-shaft S, so that it can be operated, by means of the crank-handle T, to open or close the discharge P.

As all the water which comes up through the sieve K must ultimately pass out over the overflow $a^2$, there is a tendency for all the ore which does not filter through the sieve to flow toward and congregate at the end of the sieve K immediately below the overflow $a^2$, which is easily removed through the opening. Unless guarded some of the heavier tailings would fail to pass out over the overflow and fall down and become mixed with the heavier particles of ore congregated near the opening, and so render the separation incomplete. In order to prevent this, I provide a guard U, which throws these tailings back onto the sieve, when the next current will carry them out.

In the foregoing drawings and descriptions I have set forth a preferred form of apparatus for carrying my invention into effect; but this is capable of many alterations without departing from the spirit of the invention. For instance, the compartments M need not be water-tight and supplied from a reservoir N, this being simply a preferred device for obtaining the internal pressure which automatically operates the valves O; but

What I claim to be new, and wish to secure by Letters Patent, is—

1. The combination in an ore-concentrator of a water-tank; a separating sieve or grate mounted in the upper portion thereof; a pair of wing arms carrying swinging valves or gates and pivoted immediately facing each other at an angle opening upward immediately under the sieve or grate; and means for simultaneously reciprocating the wing arms toward and away from each other, substantially as and for the purpose set forth.

2. The combination, in an ore-concentrator, of a water-tank; a separating sieve, or grate, mounted in the upper portion thereof; a pair of wing arms, carrying swinging valves, or gates; means for simultaneously reciprocating the wing-arms toward and away from each other under the sieve or grate; a water-supply compartment containing water under pressure; and a yielding valve in the supply-compartment communicating with the space back of the wing arms, substantially as and for the purpose set forth.

3. The combination, in an ore-concentrator, of a water-tank; a grate, or sieve, mounted in the upper portion thereof; a pair of wing arms carrying swinging valves or gates and adapted to be reciprocated under the sieve or grate; springs tending to press the pair of wing arms together; a cam adapted to contact with the rollers carried by the wing arms, forcing them slowly apart and permitting them to be suddenly thrown together, substantially as and for the purpose set forth.

4. The combination, in an ore-concentrator, of a water-tank; a grate, or sieve, mounted in the upper portion thereof; a pair of wing arms carrying swinging valves or gates and adapted to be reciprocated under the sieve or grate; springs tending to press the pair of wing arms together; a cam adapted to contact with the rollers carried by the wing arms, forcing them slowly apart and permitting them to be suddenly thrown together; water-supply compartments, containing water under pressure and spring-pressed valves in the supply-compartments communicating with the space back of the wing arms, substantially as and for the purpose set forth.

5. The combination, in an ore-concentrator, of a water-tank; a grate, or sieve, mounted in the upper portion thereof; a pair of wing arms carrying swinging valves, or gates, and adapted to be reciprocated under the sieve or grate; springs tending to press the wing arms together; means, substantially as described, for regulating the tension of the spring-arms and a cam adapted to contact with rollers carried by the wing arms, forcing them slowly apart and permitting them to be suddenly thrown together, substantially as and for the purpose set forth.

GEO. T. COOLEY.

Witnesses:
JNO. C. KEENAN,
H. B. HENING.